United States Patent
Teranishi et al.

(10) Patent No.: US 8,465,648 B2
(45) Date of Patent: Jun. 18, 2013

(54) CERAMIC PERVAPORATION MEMBRANE AND CERAMIC VAPOR-PERMEABLE MEMBRANE

(75) Inventors: Makoto Teranishi, Nagoya (JP); Hideyuki Suzuki, Kasugai (JP); Satoshi Sakashita, Yokkaichi (JP); Manabu Isomura, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/289,223

(22) Filed: Nov. 4, 2011

(65) Prior Publication Data

US 2012/0074061 A1    Mar. 29, 2012

Related U.S. Application Data

(63) Continuation of application No. PCT/JP2010/058339, filed on May 18, 2010.

(30) Foreign Application Priority Data

May 18, 2009  (JP) .................................. 2009-120050
Mar. 31, 2010  (JP) .................................. 2010-081486

(51) Int. Cl.
  *B01D 15/00*    (2006.01)
  *B01D 39/00*    (2006.01)
  *B01D 39/06*    (2006.01)
  *B01D 53/22*    (2006.01)
  *B01D 59/12*    (2006.01)
  *B01D 39/20*    (2006.01)

(52) U.S. Cl.
  USPC ................... 210/640; 210/500.25; 210/510.1; 55/523; 55/524; 96/4

(58) Field of Classification Search
  USPC ................... 210/500.25, 510.1, 640, 321.75, 210/490; 55/523, 524; 95/50; 94/4
  See application file for complete search history.

(56) References Cited

U.S. PATENT DOCUMENTS

| | | | | |
|---|---|---|---|---|
| 4,417,908 A | * | 11/1983 | Pitcher, Jr. ...................... | 55/523 |
| 4,420,316 A | * | 12/1983 | Frost et al. ...................... | 55/523 |
| 4,428,758 A | * | 1/1984 | Montierth ...................... | 55/523 |
| 4,781,831 A | | 11/1988 | Goldsmith | |
| 5,009,781 A | | 4/1991 | Goldsmith | |
| 5,108,601 A | | 4/1992 | Goldsmith | |
| 5,114,581 A | * | 5/1992 | Goldsmith et al. ........... | 210/650 |
| 5,242,595 A | * | 9/1993 | Morgart et al. ............... | 210/636 |

(Continued)

FOREIGN PATENT DOCUMENTS

| | | |
|---|---|---|
| JP | 01-501354 A1 | 6/1989 |
| JP | 03-500386 A1 | 1/1991 |

(Continued)

OTHER PUBLICATIONS

Canadian Office Action dated Sep. 5, 2012.

*Primary Examiner* — Ana Fortuna
(74) *Attorney, Agent, or Firm* — Burr & Brown

(57) ABSTRACT

A ceramic pervaporation membrane and a ceramic vapor-permeable membrane where the total aperture length of discharge channels parallel to the channel direction of water collection cells is at least 10% of the length of filtration cells and where the ratio m/n of the number m of rows of filtration cells to the number n of rows of water collection cells is between 1 and 4 have a high water permeation rate and a high separation coefficient.

8 Claims, 6 Drawing Sheets

U.S. PATENT DOCUMENTS

| | | | |
|---|---|---|---|
| 5,501,804 A * | 3/1996 | Hall et al. | 210/805 |
| 5,855,781 A | 1/1999 | Yorita et al. | |
| 6,126,833 A | 10/2000 | Stobbe et al. | |
| 6,387,269 B1 * | 5/2002 | Eltner et al. | 210/640 |
| 6,953,493 B2 | 10/2005 | Nakayama et al. | |
| 6,958,087 B2 | 10/2005 | Suzuki | |
| 7,014,680 B2 | 3/2006 | Nakayama et al. | |
| 7,717,272 B2 | 5/2010 | Isomura et al. | |
| 7,819,944 B2 * | 10/2010 | Yajima et al. | 95/52 |
| 2001/0002008 A1 | 5/2001 | Yorita et al. | |
| 2002/0179519 A1 | 12/2002 | Yorita et al. | |
| 2005/0175250 A1 * | 8/2005 | Watanabe et al. | 382/247 |
| 2005/0279693 A1 * | 12/2005 | Katsu et al. | 210/321.87 |
| 2006/0175250 A1 * | 8/2006 | Shimodaira | 210/510.1 |
| 2008/0105613 A1 * | 5/2008 | Ichikawa et al. | 210/510.1 |

FOREIGN PATENT DOCUMENTS

| | | |
|---|---|---|
| JP | 04-000892 Y2 | 1/1992 |
| JP | 06-016819 B2 | 3/1994 |
| JP | 06-086918 A1 | 3/1994 |
| JP | 06-099039 A1 | 4/1994 |
| JP | 2000-153117 A1 | 6/2000 |
| JP | 2002-537104 A1 | 11/2002 |
| JP | 2003-286018 A1 | 10/2003 |
| JP | 2004-066188 A1 | 3/2004 |
| JP | 3868391 B2 | 1/2007 |
| JP | 3933907 B2 | 6/2007 |
| JP | 3953833 B2 | 8/2007 |
| JP | 4006107 B2 | 11/2007 |
| WO | 2008/050812 A1 | 5/2008 |

* cited by examiner

CERAMIC PERVAPORATION MEMBRANE AND CERAMIC VAPOR-PERMEABLE MEMBRANE

This application is a continuation of PCT/JP2010/058339, filed on May 18, 2010, which claims priority based on Japan 2009-120050, filed on May 18, 2009; and Japan 2010-081486, filed on Mar. 31, 2010.

FIELD OF THE INVENTION

The present invention relates to a ceramic monolith type pervaporation membrane and vapor permeable membrane.

BACKGROUND OF THE INVENTION

In recent years, there have been used ceramic filters to selectively collect only a specific component from a mixture (mixed fluid) of many components. Since a ceramic filter is excellent in mechanical strength, durability, corrosion resistance, and the like in comparison with filters of organic polymers, the ceramic filter is preferably used for removing suspended solids, bacteria, dust, and the like in liquid or gas in wide fields such as water treatment, exhaust gas treatment, medicine, food, and the like.

In order to improve water permeation performance while securing separation performance in such a filter made of ceramic (referred to as a ceramic filter), it is necessary to increase the membrane area (area of the separation membrane). For this purpose, it is desirable that the filter has a monolith shape (or honeycomb shape). A monolith type filter is superior to a tube type filter in that it is hardly broken and that the cost is reduced. Most monolith type filters have a circular columnar external shape provided with a porous support having a large number of parallel channels (referred to as cells) therein formed in the axial direction and a separation membrane having a small pore diameter in comparison with that of the porous support on internal wall faces forming the cells.

Examples of prior art documents disclosing a conventional monolith type (or honeycomb type) ceramic filter include Patent Documents 1 to 5.

In the ceramic honeycomb filter disclosed in Patent Document 1, a slit-shaped gap portion is provided in the longitudinal direction of the porous support (porous substrate) to increase the permeation amount from the cells near the central portions of the porous support. Since, in a large monolith type filter, permeated fluid permeated through the cells near the central portion of the porous support receives large flow resistance upon flowing out from the porous support, and therefore the separation performance (filtration treatment performance) is low in comparison with the area of the filtration membrane actually formed, this ceramic honeycomb filter has been proposed for the purpose of improvement of the separation performance.

In the ceramic honeycomb filter disclosed in Patent Document 2, a filtration membrane having a smaller pore diameter than that of the porous body is formed on the inner wall faces of the numerous parallel cells formed in the longitudinal direction of the cylindrical porous body, a discharge channel is provided in the longitudinal direction of the porous body in order to increase the permeation amount from the cells near the center of the porous body, and the edge portion of the water collection cells communicating with the discharge channel is plugged by a plugging member.

In a ceramic honeycomb filter disclosed in Patent Document 3, plugging members are provided only in the predetermined spaces lest liquid stagnation should be formed. Since stagnation of the permeated fluid (filtration fluid) inside the filter can effectively be inhibited by the use of this ceramic honeycomb filter, it is possible to supply permeated fluid having high cleanliness.

The cross flow type filtration apparatus disclosed in Patent Document 4 is provided with a structure (ceramic filter) having plural (three or more) filtration cells between water collection cells and has low pressure loss, and therefore suitable for various uses for precise filtration, ultrafiltration, reverse permeation, gas separation, pervaporation, and the like.

The ceramic filter disclosed in Patent Document 5 has a structure where a filtration cell is adjacent to a side of a water collection cell and has high water permeation amount and high reverse wash efficiency when it is used for ultrafiltration or precise filtration.

PRIOR ART DOCUMENT

Patent Document
  Patent Document 1: JP-A-6-99039
  Patent Document 2: JP-A-2000-153117
  Patent Document 3: U.S. Pat. No. 3,868,391
  Specification
  Patent Document 4: JP-B-6-016819
  Patent Document 5: JP-Y-4-892

SUMMARY OF THE INVENTION

However, any of the aforementioned prior art techniques has a problem as follows.

In a ceramic honeycomb filter of Patent Document 1, there may be caused breakage upon firing or placing in a housing due to the structure or sealing failure according to the breakage. In the ceramic honeycomb filter disclosed in Patent Document 2, though it has excellent separation performance when it is used as a separation means in a precise filtration method, since the permeation rate is high in the case that the permeation separation component is gas in comparison with the case that the permeation separation component is liquid, pressure loss becomes high to reduce permeation flow amount per unit time, which is not suitable for pervaporation and vapor permeation.

Though a ceramic honeycomb filter disclosed in Patent Document 3 has particularly excellent separation performance in the case that the permeation separation component is liquid, the permeation rate is high in the case that the permeation separation component is gas in comparison with the case that the permeation separation component is liquid, pressure loss becomes high to reduce permeation flow amount per unit time. In the filtration apparatus disclosed in Patent Document 4, though it has excellent separation performance when it is used as a separation means by a precise filtration method, pressure loss becomes high to reduce permeation rate with a low separation coefficient when it is used as a separation means by a pervaporation method. That is, the techniques disclosed in Patent Documents 3 and 4 are not preferable for pervaporation or vapor permeation. Since the ceramic filter of Patent Document 5 is not used for pervaporation, the separation performance when it is used as a separation means by pervaporation is unknown.

The present invention has been made in view of such circumstances, and the aim is to provide a pervaporation membrane and a vapor permeable membrane having high permeation rate and high separation coefficient. As a result of repeated research, it has been found out that the aim can be achieved by a ceramic filter having a monolith shape having filtration cells and water collection cells, where the total aperture length of the discharge channels is at least 10% of the length of the filtration cells and the water collection cells or a ceramic filter where the filtration cells closely adhere to the water collection cells, which has led to the completion of the present invention.

That is, in the first place, according to the present invention, there is provided a ceramic pervaporation membrane provided with a porous body and a separation membrane, wherein the porous body has both end faces and an outer peripheral face, plural filtration cells extending from one end face to the other end face and forming rows, and plural water collection cells extending from one end face to the other end face and forming rows, the water collection cells being plugged in both the end faces, and discharge channels provided so that the water collection cells communicate with an external space, the separation membrane is disposed on inner wall faces of the filtration cells of the porous body, and total aperture length of the discharge channels parallel to the channel direction of the water collection cells is at least 10% of the length of the filtration cells (first ceramic pervaporation membrane of the present invention).

In the first ceramic pervaporation membrane of the present invention, the total aperture length of the discharge channels parallel to the channel direction of the water collection cells is preferably at least 15%, particularly preferably at least 20% of the length of the filtration cells.

In the first ceramic pervaporation membrane of the present invention, it is preferable that the plural discharge channels are formed and that the longest interval between discharge channels adjacent to each other in the channel direction of the water collection cells is at most 80% of the length of the filtration cells. The ratio of the longest interval between discharge channels is more preferably at most 45%, furthermore preferably at most 40%, particularly preferably at most 30%.

In the first ceramic pervaporation membrane of the present invention, the upper limit of the ratio of the total aperture length of the discharge channels is 40% from the viewpoint of mechanical strength of the ceramic pervaporation membrane. In addition, the ratio of the one aperture length is preferably at most 10% from the viewpoint of mechanical strength of the ceramic pervaporation membrane likewise.

In the first ceramic pervaporation membrane of the present invention, it is preferable that the ratio m/n of the number m of the rows of filtration cells to the number n of the rows of water collection cells is between 1 and 4. A preferable mode of the first ceramic pervaporation membrane of the present invention has the characteristics of the second ceramic pervaporation membrane of the present invention described later.

In the first ceramic pervaporation membrane of the present invention, it is preferable that the number of the rows of filtration cells between two rows of water collection cells is at most 3. This also has the characteristics of the second ceramic pervaporation membrane of the present invention described later.

In the first ceramic pervaporation membrane of the present invention, it is preferable that the number of the rows of filtration cells between two rows of water collection cells is 2 and that the filtration cells are constantly adjacent to the water collection cells. This also has the characteristics of the second ceramic pervaporation membrane of the present invention described later.

Next, according to the present invention, there is provided a ceramic pervaporation membrane provided with a porous body and a separation membrane, wherein the porous body has both end faces and an outer peripheral face, plural filtration cells extending from one end face to the other end face and forming rows, and plural water collection cells extending from one end face to the other end face and forming rows, the water collection cells being plugged in both the end faces, and discharge channels provided so that the water collection cells communicate with an external space, the separation membrane is disposed on inner wall faces of the filtration cells of the porous body, and the ratio m/n of the number m of the rows of filtration cells to the number n of the rows of water collection cells is between 1 and (second ceramic pervaporation membrane of the present invention).

In the second ceramic pervaporation membrane of the present invention, it is preferable that the number of the rows of filtration cells between two rows of water collection cells is at most 3.

In the second ceramic pervaporation membrane of the present invention, it is preferable that the number of the rows of filtration cells between two rows of water collection cells is 2 and that the filtration cells are constantly adjacent to the water collection cells.

In the second ceramic pervaporation membrane of the present invention, it is preferable that the length of the filtration cells is 300 mm or more and 1500 mm or less. The length of the filtration cells is more preferably 500 mm or more and 1500 mm or less. The length of the filtration cells is particularly preferably 500 mm or more and 1000 mm or less.

In a ceramic pervaporation membrane of the present invention, as the cross-sectional shape of the water collection cells and filtration cells, there can be employed an arbitrary shape such as a circle, a quadrangle, a hexagon, or an octagon. In the second ceramic pervaporation membrane of the present invention, it is preferable that the cross-sectional shape of the filtration cells is circular. The cross-sectional shape of the (filtration or water collection) cells means the shape of the (filtration or water collection) cells, the shape is shown on across section perpendicular to the direction connecting both the end faces in the porous body having the end faces and the outer peripheral face (also referred to as the longitudinal direction of the cells).

In the second ceramic pervaporation membrane of the present invention, it is preferable that total aperture length of the discharge channels parallel to the channel direction of the water collection cells is at least 10% of the length of the filtration cells. A preferable mode of the second ceramic pervaporation membrane of the present invention has the characteristics of the first ceramic pervaporation membrane described above of the present invention. That is, a preferable mode of the second ceramic pervaporation membrane is the same as a preferable mode of the first ceramic pervaporation membrane.

In the second ceramic pervaporation membrane of the present invention, it is preferable that total aperture length of the discharge channels parallel to the channel direction of the water collection cells is at least 20% of the length of the filtration cells. This also has the characteristics of the first ceramic pervaporation membrane of the present invention described above.

In the second ceramic pervaporation membrane of the present invention, it is preferable that the plural discharge channels are formed and that the longest interval between discharge channels adjacent to each other in the channel direction of the water collection cells is at most 80% of the length of the filtration cells. The ratio of the longest interval between discharge channels is more preferably at most 45%, furthermore preferable at most 40%, particularly preferably at most 30%. This also has the characteristics of the first ceramic pervaporation membrane of the present invention described above.

Next, according to the present invention, there is provided a dehydration method for removing moisture as vapor from an aqueous solution or a mixed phase liquid of water and an organic solvent by using the second ceramic pervaporation membrane according to any one of the aforementioned inventions (first dehydration method of the present invention). For example, an aqueous solution having a water concentration of 1 to 99% (mass ratio) or a mixed phase liquid of water and an organic solvent is a target for dehydration. Examples of the first dehydration method of the present invention includes aqueous solution dehydration methods where water (moisture) is removed by pervaporation from alcohol aqueous solutions such as methanol aqueous solution and ethanol aqueous solution, carboxylic acids such as acetic acid, ketons such as acetone, and amines such as ethyl amine.

Next, according to the present invention, there is provided a ceramic vapor-permeable membrane provided with a porous body and a separation membrane, wherein the porous body has both end faces and an outer peripheral face, plural filtration cells extending from one end face to the other end face and forming rows, and plural water collection cells extending from one end face to the other end face and forming rows, the water collection cells being plugged in both the end faces, and discharge channels provided so that the water collection cells communicate with the external space, the separation membrane is disposed on inner wall faces of the filtration cells of the porous body, and total aperture length of the discharge channels parallel to the channel direction of the water collection cells is at least 10% of the length of the filtration cells (first ceramic vapor-permeable membrane of the present invention).

In the first ceramic vapor-permeable membrane of the present invention, the total aperture length of the discharge channels parallel to the channel direction of the water collection cells is preferably at least 15%, particularly preferably at least 20%, of the length of the filtration cells.

In the first ceramic vapor-permeable membrane of the present invention, it is preferable that the plural discharge channels are formed and that the total aperture length of the discharge channels parallel to the channel direction of the water collection cells is at most 80% of the length of the filtration cells. The ratio of the longest interval between discharge channels adjacent to each other is more preferably at most 45%, furthermore preferably at most 40%, particularly preferably at most 30%.

In the first ceramic vapor-permeable membrane of the present invention, the upper limit of the ratio of the total aperture length of the discharge channels is 40% from the viewpoint of mechanical strength of the ceramic vapor-permeable membrane. In addition, the aperture ratio of the one aperture length is preferably at most 10% from the viewpoint of mechanical strength of the ceramic vapor permeable membrane likewise.

In the first ceramic vapor-permeable membrane of the present invention, it is preferable that the ratio m/n of the number in of the rows of filtration cells to the number n of the rows of water collection cells is between 1 and 4. A preferable mode of the first ceramic vapor-permeable membrane of the present invention has the characteristics of the second ceramic vapor-permeable membrane described later of the present invention.

In the first ceramic vapor-permeable membrane of the present invention, it is preferable that the number of the rows of filtration cells between two rows of water collection cells is at most 3. This also has the characteristics of the second ceramic vapor-permeable membrane of the present invention described later.

In the first ceramic vapor-permeable membrane of the present invention, it is preferable that the number of the rows of filtration cells between two rows of water collection cells is 2 and that the filtration cells are constantly adjacent to the water collection cells. This also has the characteristics of the second ceramic vapor-permeable membrane of the present invention described later.

Next, according to the present invention, there is provided a ceramic vapor-permeable membrane comprising a porous body and a separation membrane, wherein the porous body has both end faces and an outer peripheral face, plural filtration cells extending from one end face to the other end face and forming rows, and plural water collection cells extending from one end face to the other end face and forming rows, the water collection cells being plugged in both the end faces, and discharge channels provided so that the water collection cells communicate with the external space, the separation membrane is disposed on inner wall faces of the filtration cells of the porous body, and the ratio m/n of the number m of the rows of filtration cells to the number n of the rows of water collection cells is between 1 and 4 (second ceramic vapor-permeable membrane of the present invention).

In the second ceramic vapor-permeable membrane of the present invention, it is preferable that the number of the rows of filtration cells between two rows of water collection cells is at most 3.

In the second ceramic vapor-permeable membrane of the present invention, it is preferable that the number of the rows of filtration cells between two rows of water collection cells is 2 and that the filtration cells are constantly adjacent to the water collection cells.

In the second ceramic vapor-permeable membrane of the present invention, it is preferable that the length of the filtration cells is 300 mm or more and 1500 mm or less. The length of the filtration cells is more preferably 500 mm or more and 1500 mm or less. The length of the filtration cells is particularly preferably 500 mm or more and 1000 mm or less.

In a ceramic vapor-permeable membrane of the present invention, as the cross-sectional shape of the water collection cells and filtration cells, there can be employed an arbitrary shape such as a circle, a quadrangle, a hexagon, or an octagon. In the second ceramic vapor-permeable membrane of the present invention, it is preferable that the cross-sectional shape of the filtration cells is circular. The cross-sectional shape of the (filtration or water collection) cells means the shape of the (filtration or water collection) cells, the shape being shown on a cross section perpendicular to the direction connecting both the end faces in the porous body having the end faces and the outer peripheral face (also referred to as the longitudinal direction of the cells).

In the second ceramic vapor-permeable membrane of the present invention, it is preferable that total aperture length of the discharge channels parallel to the channel direction of the water collection cells is at least 10% of the length of the filtration cells. A preferable mode of the second ceramic vapor-permeable membrane of the present invention has the characteristics of the first ceramic vapor-permeable membrane of the present invention described above. That is, a preferable mode of the second ceramic vapor-permeable membrane is the same as a preferable mode of the first ceramic vapor-permeable membrane.

In the second ceramic vapor-permeable membrane of the present invention, it is preferable that total aperture length of the discharge channels parallel to the channel direction of the water collection cells is at least 20% of the length of the filtration cells. This also has the characteristics of the first ceramic vapor-permeable membrane of the present invention described above.

In the second ceramic vapor-permeable membrane of the present invention, it is preferable that the plural discharge channels are formed and that the longest interval between discharge channels adjacent to each other in the channel direction of the water collection cells is at most 80% of the length of the filtration cells. The ratio of the longest interval between discharge channels is more preferably at most 45%, furthermore preferably at most 40%, particularly preferably at most 30%. This also has the characteristics of the first ceramic vapor-permeable membrane of the present invention described above.

Next, according to the present invention, there is provided a dehydration method for removing moisture as vapor from mixed gas of water and an organic solvent by using the second ceramic vapor-permeable membrane according to any one of the aforementioned inventions (second dehydration method of the present invention). For example, mixed gas having a water concentration of 1 to 99% (mass ratio) of water and an organic solvent is a target for dehydration. Examples of the second dehydration method of the present invention includes dehydration methods where water (moisture) is removed by vapor permeation from mixed gas containing water (vapor) and alcohol such as methanol or ethanol, carboxylic acids such as acetic acid, ketons such as acetone, or amines such as ethyl amine.

In the present specification, both the first ceramic pervaporation membrane of the present invention and the second ceramic pervaporation membrane of the present invention are simply referred to as ceramic pervaporation membranes of the present invention. Both the first ceramic vapor-permeable membrane of the present invention and the second ceramic vapor-permeable membrane of the present invention are simply referred to as ceramic vapor-permeable membranes of the present invention. Both the first dehydration method of the present invention and the second dehydration method of the present invention are simply referred to as dehydration methods of the present invention. In addition, in the present invention, both the filtration cells and the water collection cells may simply be referred to as cells.

In the (first and second) ceramic pervaporation membranes of the present invention and the (first and second) ceramic vapor-permeable membranes of the present invention, the porous body has an almost columnar external shape, and, since filtration cells and water collection cells extending from one end face to the other end face are formed, the length of the filtration cells and the length of the water collection cells are substantially equivalent to the length of the porous body (axial length). That is, the length of the water collection cells is equivalent to the length of the filtration cells. In the first ceramic pervaporation membrane of the present invention and the first ceramic vapor-permeable membrane of the present invention, the total aperture length of the discharge channels parallel to the channel direction of the filtration cells is at least 10% of the length of the water collection cells. As described above, since the apertures on both the end faces of the water collection cells are plugged, the length of the water collection cells includes the plugging portions (plugging members).

In the ceramic pervaporation membrane of the present invention and a ceramic vapor-permeable membrane of the present invention, the discharge channel allows the water collection cells to communicate with the external space. The discharge channel (water collection slit) allows plural water collection cells formed in rows to communicate with one another and allows plural water collection cells to communicate with the external space by having aperture on the outer peripheral face of the porous body. Since the total aperture length of the discharge channels parallel to the channel direction of the filtration cells is at least 10% of the length of the filtration cells, the discharge channel forms a thin (narrow) space like a slit-shaped gap. The aperture shown on the outer peripheral face of the porous body is literally a slit. In a ceramic pervaporation membrane of the present invention and a ceramic vapor-permeable membrane of the present invention, formation of plural discharge channels means formation of plural discharge channels in the space when plural water collection cells communicating with one another are regarded as one space. In other words, the number of the discharge channels is the number of discharge channels provided for every plural water collection cells communicated with one another. In preferable modes of a ceramic pervaporation membrane of the present invention and a ceramic vapor-permeable membrane of the present invention, the discharge channel allows plural water collection cells formed in a row to communicate with one another and does not allow water collection cells in another row to communicate with one another. Therefore, in the case that there are plural rows of plural water collection cells, plural discharge channels are formed for each row. The number of discharge channels is preferably the same among all the rows (of the water collection cells). On the other hand, in the case that there are plural discharge channels, the length of the apertures may be the same, or the length of the apertures may be varied.

Though a ceramic pervaporation membrane of the present invention is referred to as a pervaporation membrane, it is a ceramic filter used for pervaporation. In addition, though a ceramic pervaporation membrane of the present invention is referred to as a vapor-permeable membrane, it is a ceramic filter used for vapor permeation. In a ceramic pervaporation membrane of the present invention and a ceramic vapor-permeable membrane of the present invention, the porous body having both the end faces and the outer peripheral face has an almost columnar external shape. Though the external shape is preferably circular columnar because of easy casing, it may be a quadrangular columnar shape or the like. The porous body having such an external shape has plural filtration cells and water collection cells extending from one end face to the other end face and forming rows. A separation membrane is disposed on the inner wall of the filtration cells of the porous body. That is, both a ceramic pervaporation membrane of the present invention and a ceramic vapor-permeable membrane of the present invention are monolith type filters. The inner wall face of the filtration cell where the separation membrane is disposed means an (internal) surface of the porous body where the filtration cell is formed and surface of a partition wall (wall partitioning cells (porous body itself)).

In a ceramic pervaporation membrane of the present invention and a ceramic vapor-permeable membrane of the present invention, for example, when the ratio m/n of the number m of the rows of filtration cells to the number n of the rows of water collection cells is 1, the rows of filtration cells and the rows of water collection cells can alternately be disposed. For example, when the ratio m/n of the number m of the rows of filtration cells to the number n of the rows of water collection cells is 2, one row of water collection cells is for two rows of filtration cells, and, in this case, two rows of filtration cells can be disposed between two rows of water collection cells. Thus, when the ratio m/n is 1 or 2, it is possible to dispose the filtration cells and water collection cells to be constantly adjacent to each other. For example, when the ratio m/n of the number m of the rows of filtration cells to the number n of the rows of water collection cells is 3, one row of water collection cells is for three rows of filtration cells. In other words, three rows of filtration cells can be disposed between two rows of water collection cells.

In a ceramic pervaporation membrane of the present invention and a ceramic vapor-permeable membrane of the present invention, as long as the ratio m/n of the number m of the rows of filtration cells to the number n of the rows of water collection cells is between 1 and 4 as a whole, the number of the rows of filtration cells between two rows of water collection cells (between the rows of water collection cells) may partially be above 4. In a preferable mode, the number of the row of the filtration cells between two rows of water collection cells is always between 1 to 4, and, in more preferable mode, the number of the rows of filtration cells between two rows of water collection cells is always between 1 to 3.

There is a case where the filtration cells are located on the outer peripheral face side without being located between two rows of water collection cells. In a ceramic pervaporation membrane of the present invention and a ceramic vapor-permeable membrane of the present invention, as long as the ratio m/n of the number m of the rows of filtration cells to the number n of the rows of water collection cells is between 1 and 4 as a whole, the number of the rows of filtration cells between the water collection cells and the outer peripheral face may be above 4 in this portion. However, even in this portion, the number of the rows of filtration cells between the water collection cells and the outer peripheral face is preferably between 1 and 4.

Incidentally, as described above, since there may be a portion where the filtration cells are located on the outer peripheral face side without being located between two rows of water collection cells, the ratio m/n of the number m of the rows of filtration cells to the number n of the rows of water collection cells as a whole does not have a constantly fixed relation with the number of the rows of filtration cells between two rows of water collection cells. For example, as described above, when three rows of filtration cells are disposed between the rows of water collection cells, the combination of water collection cells, filtration cells, filtration cells, and filtration cells is viewed, the ratio m/n of the number m or the rows of filtration cells to the number n of the rows of water collection cells is 3. However, if the water collection cells next to the filtration cells are considered, the m/n may be below 3. If the situation that the filtration cells are located on the opposite side of the water collection cells, m/n may be above 3. Though various modes of a ceramic pervaporation membrane of the present invention and a ceramic vapor-permeable membrane of the present invention can be considered, in a ceramic pervaporation membrane of the present invention and a ceramic vapor-permeable membrane of the present invention, the ratio m/n of the number m of the rows of filtration cells to the number n of the rows of water collection cells is necessarily between 1 and 4. In a preferable mode, the number of the rows of filtration cells between two rows of water collection cells is always between 1 and 4. In a more preferable mode, the number of the rows of filtration cells between two rows of water collection cells is between 1 and 3 in any portion.

In a ceramic pervaporation membrane of the present invention and a ceramic vapor-permeable membrane of the present invention, the diameter of the filtration cells and the water collection cells is preferably at most 5 mm, particularly preferably 1 to 3 mm. When the diameter is below 1 mm, a cell may be closed by deformation. On the other hand, when it is above 5 mm, the membrane area of the separation membrane becomes small. The diameter of the cells means the diameter of a circle-equivalent area of the cross-sectional shape of the cells.

In a ceramic pervaporation membrane of the present invention and a ceramic vapor-permeable membrane of the present invention, the wall thickness between cells is preferably 1.5 mm or less, particularly preferably 0.2 to 1.5 mm. When the wall thickness is below 0.2 mm, the wall greatly deforms due to the thermal treatment (firing) upon manufacturing, which may close a cell. On the other hand, when it is above 1.5 mm, the water permeation rate becomes small due to increase in pressure loss to deteriorate separation performance per ceramic pervaporation membrane (or ceramic vapor-permeable membrane of the present invention). The wall thickness between cells means thickness of a wall (porous body) between cells and the shortest distance between cells.

Next, an effect of the invention will be described with a case of ceramic pervaporation membrane. The difference between pervaporation and vapor permeation is whether the mixed fluid (mixture) to be separated is liquid (pervaporation) or gas (vapor permeation), it is common that the permeated separation component is gas, and the separation mechanism is the same between them. Therefore, the effect of a ceramic pervaporation membrane of the present invention shown below can similarly be obtained also in a ceramic vapor-permeable membrane of the present invention.

In the first ceramic pervaporation membrane of the present invention, since the total aperture length of the discharge channels parallel to the channel direction of the water collection cells is at least 10%, preferably at least 20%, of the length of the filtration cells, even when the permeation separation component is gas, reduction of the permeation flow amount per unit time can be inhibited. That is, efficient separation is possible, and therefore it is economically excellent. When the total aperture length of the discharge channels is below 10%, the reduction of the pressure lass is insufficient, and the permeation flow amount per unit time of the permeation separation component is reduced.

In a preferable mode of the first ceramic pervaporation membrane of the present invention, since the plural discharge channels are formed, and the longest interval between discharge channels adjacent to each other in the channel direction of the water collection cells is at most 45% of the length of the filtration cells, the aforementioned effect can be obtained particularly easily. That is, even if the permeation separation component is gas, pressure loss can be reduced, and reduction of permeation flow amount per unit time can further be inhibited.

In a ceramic pervaporation membrane of the present invention (a preferable mode of the first ceramic pervaporation membrane of the present invention and the second ceramic pervaporation membrane of the present invention), the ratio m/n of the number m of the rows of filtration cells to the number n of the rows of water collection cells is between 1 and 4, the number of the rows of filtration cells between two rows of water collection cells is preferably at most 3, the number of the rows of filtration cells between two rows of water collection cells is more preferably 2, and the filtration cells are constantly adjacent to the water collection cells. Therefore, in pervaporation, water permeation rate is high, and separation coefficient is high. That is, it is an excellent pervaporation membrane.

The effect can be obtained because of the following reason. That is, when the ratio m/n of the number m of the rows of filtration cells to the number n of the rows of water collection cells is between 1 and 4, the filtration cells are close to the water collection cells in comparison with the case where the m/n is above 4. When the number of the rows of filtration cells between two rows of water collection cells is 2, where the filtration cells are constantly adjacent to the water collection cells, the filtration cells are closer to the water collection cells than in the case where the m/n is above 4. In such a ceramic pervaporation membrane of the present invention, the water permeation rate per membrane area is high in comparison with a conventional pervaporation membrane (having m/n of above 4), and, as a result, the water permeation flow rate per ceramic pervaporation membrane becomes high.

The reason why a ceramic pervaporation membrane of the present invention is superior to a conventional filter for pervaporation is that the ratio m/n of the number m of the rows of filtration cells to the number n of the rows of water collection cells influences more in the case of pervaporation than in the case of precise filtration, ultrafiltration, gas separation, or reverse permeation.

One of the reasons why the influence of m/n is strong is that, since permeation is caused by differential pressure between vapor pressure of fed liquid and pressure on the permeation side in pervaporation, driving is performed by a small differential pressure (between membranes) in comparison with precise filtration or the like. The formula (1) is a basic formula of membrane permeation for obtaining permeation rate of a component i (e.g., water). As shown in the formula (1), since the permeation rate is determined by the difference (differential pressure) between the inlet pressure and the outlet pressure of the membrane, reduction of the differential pressure greatly influences the permeation rate in pervaporation, which has relatively small differential pressure in comparison with precise filtration or the like. The reduction of the differential pressure can be inhibited if the ratio m/n of the number m of the rows of filtration cells to the number n of the rows of water collection cells is between 1 and 4, if the number of the rows of filtration cells between two rows of water collection cells is preferably at most 3, or if the number of the rows of filtration cells between two rows of water collection cells is more preferably 2 to allow the filtration cells to constantly be adjacent to the water collection cells.

[Formula 1]

$$J_i = P_i \times (X_{i1} \cdot \gamma_i \cdot p_i^0 - X_{i2} \cdot p_1) \\ = P_i \times (p_i 1 - p_i 2) \quad (1)$$

$J_i$: permeation rate of component $i$ (kg/m²·h)
$Per_i$: permeation coefficient of component $i$ ((kg/m²·h·Pa)
$X_{i1}$: mole fraction on component $i$ supply side (−)
$X_{i2}$: mole fraction on component $i$ permeation side (−)
$\gamma_i$: activity coefficient of component $i$ (−)
$p_i^0$: saturated vapor pressure of component $i$ (Pa)
$P_i$: pressure on permeation side (Pa)
$p_i 1$: membrane inlet pressure of component $i$ (Pa)
$p_i 2$: membrane outlet pressure of component $i$ (Pa)

The second reason is because, though pervaporation employs gas as the permeation fluid to perform separation by reducing pressure on the permeation side, the reduction of pressure raises the volume flow rate of the permeation fluid, and the increase makes the pressure loss upon the treatment (upon passing through the ceramic pervaporation membrane) larger than that in the case of precise filtration or the like. The formula (2) is a basic formula of membrane permeation for obtaining permeation rate in the case that the component is water, the formula (3) is a basic formula of membrane permeation for obtaining permeation rate in the case that the component is ethanol, the formula (4) shows that the outlet pressure p2 of the membrane can be obtained by the (inlet) set pressure $p_{set}$ and the pressure loss ΔP (between inlet and outlet) of the membrane, the formula (5) shows change in differential pressure based on the Darcy's law, and the formula (6) is a formula for obtaining a volume flow rate based on an equation of state of ideal gas. As derived from these formulae, a permeation fluid (e.g., water and ethanol) expands according to the formula (6) under reduced pressure to raise the volume flow rate, and pressure loss increases according to the formula (5). By the increase in pressure loss, the effective differential pressure (terms in parentheses in the formulae (2) and (3)) of the membrane in the basic formula of membrane permeation reduces, and therefore the permeation rate falls.

[Formula 2]

$$J_{water} = Per_{water} \times (p_{water} 1 - X_{water} p2) \quad (2)$$

[Formula 3]

$$J_{etha} = Per_{etha} \times (P_{etha} 1 - X_{etha} p2) \quad (3)$$

[Formula 4]

$$p2 = P_{set} + \Delta P \quad (4)$$

[Formula 5]

$$\Delta P = \beta u_s + \alpha u_s 2 \quad (5)$$

α: secondary correction term of permeation resistance (Pa·s²/m²)
β: permeation resistance of porous body (Pa·s/m)

[Formula 6]

$$u_s = (J_{water} + J_{etha}) PT / Mp2 \quad (6)$$

$u_s$: volume flow rate (m/S)

For example, in a ceramic pervaporation membrane of the present invention, in the case that the number of rows of filtration cells between two rows of water collection cells is 2 to allow the filtration cells to be constantly adjacent to the water collection cells, the water permeation rate in the pervaporation treatment rises up to about twice the rate in the case that five rows of filtration cells are disposed between two rows of water collection cells. In addition, in the case that the number of rows of filtration cells between two rows of water collection cells is 3, the water permeation rate in the pervaporation treatment rises up to about 1.67 times the rate in the case that five rows of filtration cells are disposed between two rows of water collection cells.

In contrast, as shown in Table 1, when liquid water is permeated under a pressure of 1 atm applied thereto by the use of a precise filtration membrane having a pore diameter of several hundred nm as described in, for example, Patent Document 4, in the case that the number of rows of filtration cells between two rows of water collection cells is 2 to allow the filtration cells to be constantly adjacent to the water collection cells, the water permeation rate rises only about 30% in comparison with the case that five rows of filtration cells are disposed between two rows of water collection cells. In addition, in the case that the number of rows of filtration cells between two rows of water collection cells is 3, the water permeation rate rises only about 15% in comparison with the case that five rows of filtration cells are disposed between two rows of water collection cells. That is, since the water permeation rate in the pervaporation treatment is influenced more by the disposition of the filtration cells and water collection cells than the water permeation rate in the precise filtration treatment, the mode where the ratio m/n of the number m of the rows of filtration cells to the number n of the rows of water collection cells is between 1 and 4 and where the number of the rows of filtration cells between two rows of water collection cells is preferably 2 to allow the filtration cells to be constantly adjacent to the water collection cells is effective.

TABLE 1

| | Ratio m/n of number m of rows of filtration cells to number n of rows of water collection cells | Number of rows of filtration cells between two rows of water collection cells | Water permeation amount m/day · atm | Water permeation rate $m^3$/day · atm |
|---|---|---|---|---|
| Reference Ex. 1 | 5.6 | 5 | 35 | 521 |
| Reference Ex. 2 | 3.2 | 3 | 40 | 540 |
| Reference Ex. 3 | 2.1 | 2 | 45 | 536 |

In the second ceramic pervaporation membrane of the present invention, the length of the filtration cells is 300 mm or more and 1500 mm or less in the preferable mode, it has high water permeation amount [kg/h] per membrane. It has the relation of water permeation amount [kg/h]=water permeation rate [kg/$m^2$·h]×area of filtration membrane [$m^2$]. The permeation rate is also referred to as flux or permeation flux. When the length of the filtration cells is below 300 mm, the membrane area is small to have a small water permeation amount [kg/h] per membrane. When the length of the filtration cells is above 1500 mm, temperature falls by the vaporization heat of the permeated liquid vaporized in the pervaporation treatment, and the water permeation rate decreases. Therefore, the water permeation amount per membrane does not increase (rise) for the length.

In the second ceramic pervaporation membrane of the present invention, since the cross-sectional shape of the filtration cells is circular in a preferable mode, a minute crack is hardly generated, and it has high separation coefficient. When the cross-sectional shape of the filtration cells is polygonal, a crack is easily generated in a corner portion in comparison with a circular shape, and the separation coefficient may fall.

In the first dehydration method, since moisture is removed as vapor from an aqueous solution or a water and an organic solvent multiphase solution by the use of the second ceramic pervaporation membrane of the present invention having high water permeation rate per membrane area and high separation coefficient, much moisture (water) can efficiently be removed by the small number (membrane area) of ceramic pervaporation membranes.

DETAILED DESCRIPTION OF THE INVENTION

Hereinbelow, embodiments of the present invention will be described with appropriately referring to drawings. However, the present invention should not be construed with limiting to these embodiments, and various changes, modifications, and improvements may be changed on the basis of knowledge of a person of ordinary skill in the art as long as they do not deviate from the scope of the present invention. For example, though the drawings show preferable embodiments of the present invention, the present invention is not limited by a mode shown in a drawing or information shown in a drawing. When the present invention is carried out or examined, the same means as or a means equivalent to the means described in the present specification can be applied. However, a suitable means is the means described below. For example, though the following description employs a ceramic pervaporation membrane, it should be understood that the following embodiment corresponds to an embodiment of a ceramic vapor-permeable membrane except that the mixed fluid (mixture) to be separated is not liquid (pervaporation) but gas (vapor permeation).

In the first place, the structure and the shape of one embodiment of a ceramic pervaporation membrane of the present invention will be described.

Figure 1A:
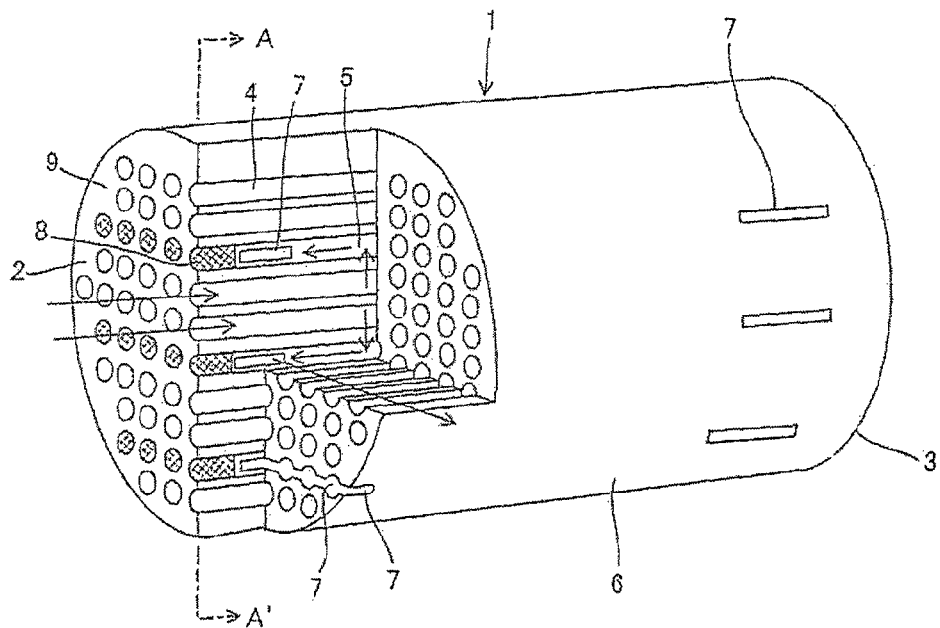
FIG. 1A is a partially cut away perspective view, showing an embodiment of a ceramic pervaporation membrane of the present invention.
Figure 1B:
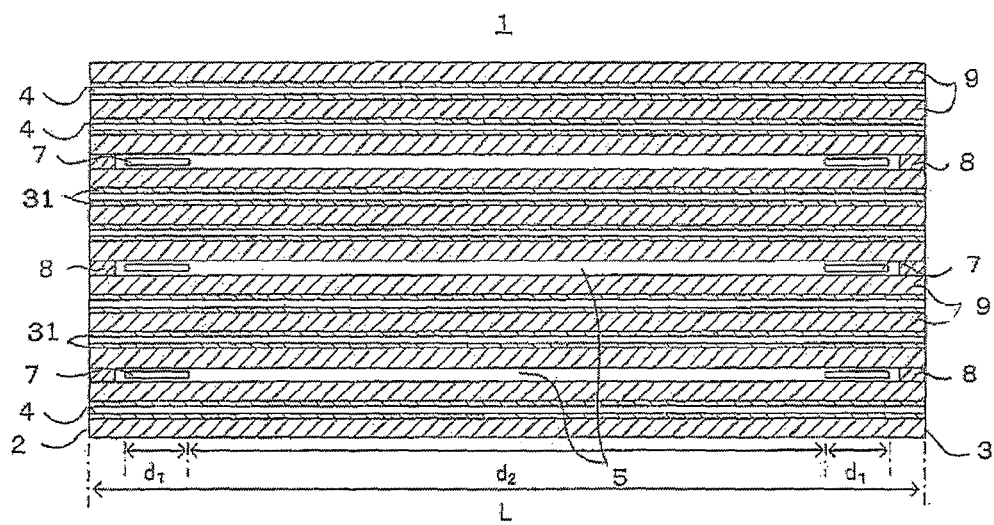
FIG. 1B is a cross-sectional view showing the A-A' cross section of FIG. 1A.
Figure 1C:
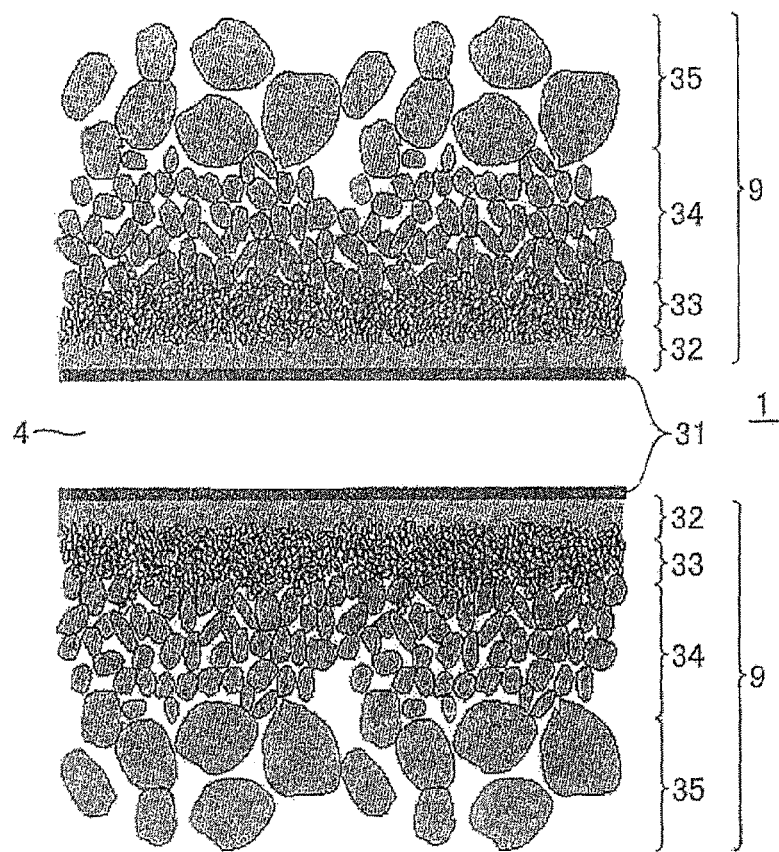
FIG. 1C is an enlarged cross-sectional view showing an enlarged vicinity of a filtration cell of FIG. 1B.

The ceramic pervaporation membrane 1 shown in FIGS. 1A to 1C is provided with a porous body 9 having both the end faces 2, 3 and the outer peripheral face 6. The porous body 9 has a circular columnar external shape and is provided with plural filtration cells 4 extending from one end face 2 to the other end face 3 (in almost the lateral direction in FIG. 1A) and forming rows and plural water collecting cells 5 extending from one end face 2 to the other end face 3 (in almost the lateral direction in FIG. 1A) and forming rows. In the ceramic pervaporation membrane 1, the cross-sectional shape of the filtration cells 4 and the water collection cells 5 is circular. Both the end faces of each filtration cell 4 are open (are kept open), while both the end faces of each water collection cell 5 are plugged with a plugging member 8, and the water collection cell 5 has a discharge channel 7 so as to communicate with the external space. On the inner wall face of each filtration cell 4 having a circular cross-sectional shape is provided a separation membrane 31.

In the ceramic pervaporation membrane 1, the discharge channel 7 is formed for every plural water collection cells 5 communicating with one another near the end faces 2, 3. In the ceramic pervaporation membrane 1, there are three rows of water collection cells 5, and the discharge channel 7 allows plural water collection cells 5 to communicate with one another in every rows of water collection cells 5 and is open on the outer peripheral face 6 of the porous body 9. As described below, since the number of discharge channels 7 is the number of the discharge channels 7 disposed for every plural water collection cells 5 communicated with one another, the number of the discharge channel 7 is not 6, but 2 in the ceramic pervaporation membrane 1.

In the ceramic pervaporation membrane 1, the total aperture length 2×d1 of the discharge channels 7 parallel to the channel direction of the water collection cells 5 is at least 10% of the length L of the water collection cells 5. On the other hand, the longest interval d2 between discharge channels 7 adjacent to each other in the channel direction of the water collection cells 5 is not 45% or less of the length L of the water collection cells 5.

In the ceramic pervaporation membrane 1, the number of the rows of filtration cells 4 between two rows of water collection cells 5 is 2, and the filtration cells 4 are constantly adjacent to the water collection cells 5. In the ceramic pervaporation membrane 1, the number m of the rows of filtration cells 4 is 7 the number n of the rows of water collection cells 5 is 3, and the ratio m/n is 2.3. In addition, the length L of the filtration cells 4 in the ceramic pervaporation membrane 1 (see FIG. 1B) is within the range from 300 to 1500 mm. Incidentally, in the present specification, the length of the water collection cells and the length of the filtration cells, which are the same, are shown by the same symbol L.

The porous body 9 is constituted of the support 35 composed of particles of 10 μm order, the first intermediate layer 34 having an average pore size of 1 μm order, the second intermediate layer 33 having an average pore size of 0.1 μm order, and the third intermediate layer 32 having an average pore size of 0.01 μm order. On the surface of the intermediate layer 32 (i.e., inner wall face of a filtration cell 4), a separation membrane 31 is disposed (see FIG. 10). Incidentally, in a ceramic pervaporation membrane of the present invention, though at least one intermediate layer is necessary, the average pore size of the intermediate layer located below the separation membrane is preferably 0.005 to 1 μm. When it is below 0.005 μm, the pressure loss is large to reduce the water permeation rate. When it is above 1 μm, strength is low to deteriorate long-term reliability as a ceramic pervaporation membrane.

The average pore size of the porous body 9 is preferably 5 to 25 μm, more preferably 6 to 20 μm, particularly preferably 8 to 16 μm. When the average pore size of the porous body is below 5 μm, the permeation rate of the permeation separation component separated by the separation membrane in the porous body is remarkably slow, and the permeation flow amount per unit time may be reduced. On the other hand, when it is above 25 μm, a separation membrane cannot be formed uniformly, and separation performance may be deteriorated. The average pore size can be measured by mercury porosimetry.

The separation membrane 31 is preferably a gas separation membrane. There is no particular limitation on the gas separation membrane, and it may appropriately be selected according to the kind of gas to be separated from a carbon monoxide separation membrane, a helium separation membrane, a hydrogen separation membrane, a carbon membrane, a DDR type zeolite membrane, a silica membrane, and the like. Examples of the separation membrane include the carbon monoxide separation membrane described in U.S. Pat. No. 4,006,107, the helium separation membrane described in U.S. Pat. No. 3,953,833, the hydrogen separation membrane described in U.S. Pat. No. 3,933,907, the carbon membrane described in JP-A-2003-286018, the DDR type zeolite membrane composite body described in JP-A-2004-66188, and the silica membrane described in WO No. 2008/050812 pamphlet.

The plugging member 8 preferably contains framework particles, inorganic bonding material, a binder, a thickener, and a water retention agent. The plugging member 8 can be formed with the same material as that for the porous body 9. The plugging member 8 is preferably coarse to discharge water contained in the slurry for the intermediate layer used upon forming the intermediate layers 32 to 34 formed between the porous body 9 and the separation membrane 31. Specifically, the porosity of the plugging member 8 is preferably 25 to 50%. When the porosity of the plugging member 8 is above 50%, solid content contained in the slurry for the intermediate layer used for forming the intermediate layer may pass through the plugging member 8. On the other hand, when the porosity of the plugging member 8 is below 20%, discharge of water contained in the slurry for the intermediate layer used for forming the intermediate layers may become difficult. The length of the plugging member 8 is a length from the end face to the discharge channel 7 and generally about 10 to 20 mm.

Though it is not illustrated, in a ceramic pervaporation membrane of the present invention, it is preferable to further provide a seal portion so as to cover the porous body on the mixed fluid inlet end face side of the ceramic pervaporation membrane, in order to inhibit the mixed fluid containing the permeation separation component from directly flowing in from the porous body portion on the end face of the ceramic pervaporation membrane and being discharged without being separated by a separation membrane formed on the inner wall of a predetermined filtration cell. The seal portion can be formed by applying a glaze on the mixed fluid inlet face, followed by firing.

Next, the different points of another embodiment of a ceramic pervaporation membrane of the present invention from the aforementioned embodiment will be described.

Figure 2:
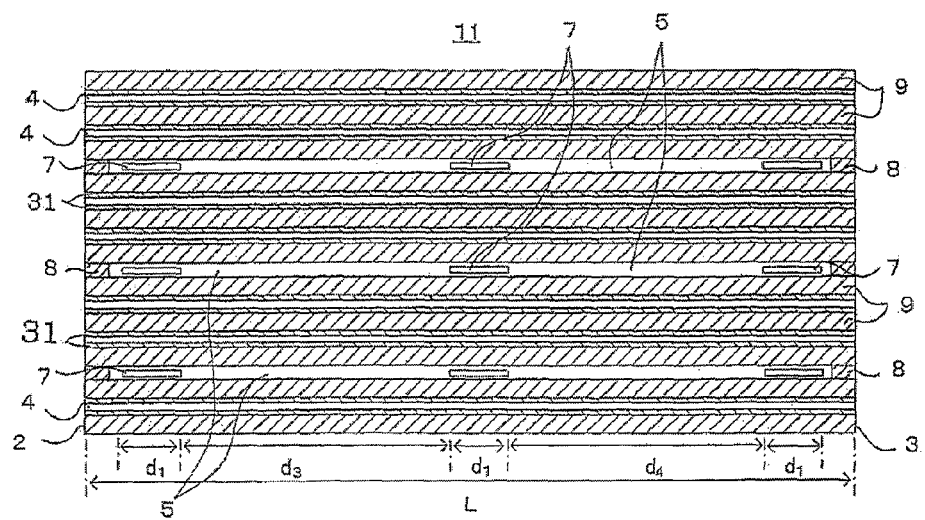
FIG. 2 is a view showing another embodiment of a ceramic pervaporation membrane of the present invention and a cross-sectional view corresponding to FIG. 1B.

In the ceramic pervaporation membrane 11 shown in FIG. 2, the number of the discharge channels 7 is 3 (not 9), and the total aperture length of the discharge channels 7 is 3×d1. The position of the discharge channels 7 added (from the ceramic pervaporation membrane 1) is around the center in the axial direction of the circular columnar ceramic pervaporation membrane (porous body). In the ceramic pervaporation membrane 11, the longest interval d3 or d4 between discharge channels 7 adjacent to each other in the channel direction of the water collection cells 5 is 45% or less of the length L of the water collection cells 5.

Figure 3:
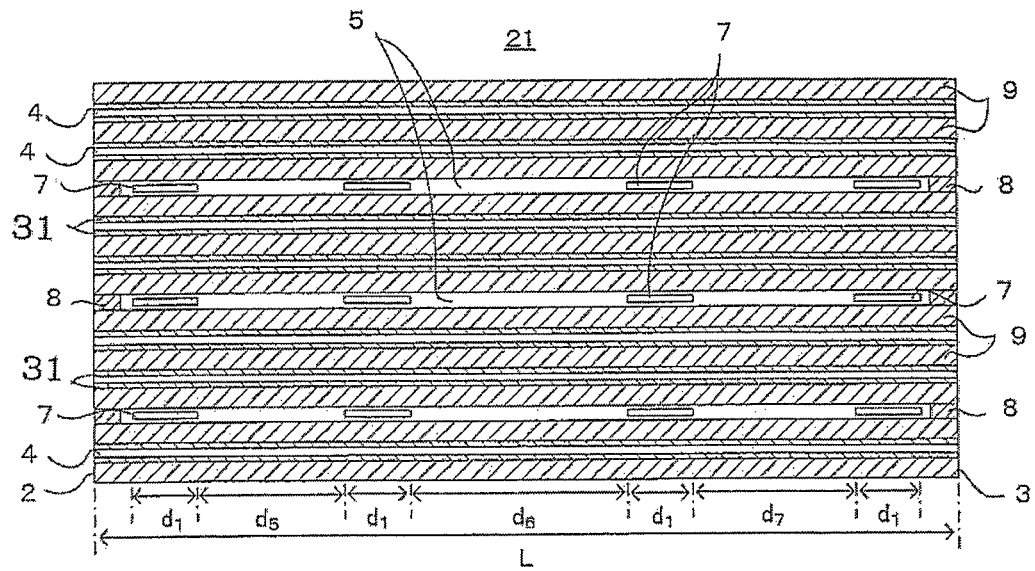
FIG. 3 is a view still another embodiment of a ceramic pervaporation membrane of the present invention and a cross-sectional view corresponding to FIGS. 1B and 2

In a ceramic pervaporation membrane 21 shown in FIG. 3, the number of the discharge channels 7 is 4 (not 12), and the total aperture length of the discharge channels 7 is 4×d1. In the ceramic pervaporation membrane 21, the longest intervals d5, d6, or d7 between discharge channels 7 adjacent to each other in the channel direction of the water collection cells 5 are all 45% or less of the length L of the water collection cells 5. The positions of the two discharge channels 7 added (from the ceramic pervaporation membrane 1) is positions where the intervals are almost even in the axial direction of the circular columnar ceramic pervaporation membrane (porous body). The interval d6 is slightly longer, and they are almost d6>d5=d7.

Figure 5:
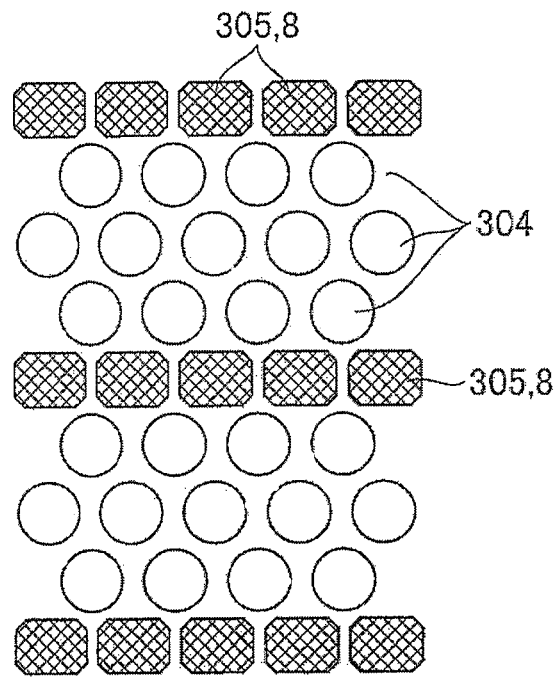
FIG. 5 is a view showing still another embodiment of a ceramic pervaporation membrane of the present invention and a view of the enlarged end face.
Figure 6A:
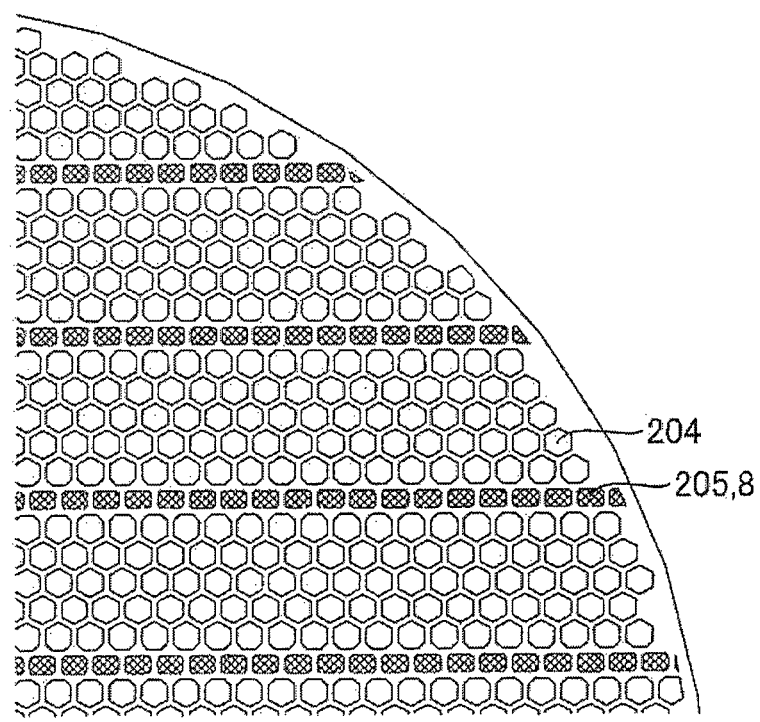
FIG. 6A is a view showing an example of a ceramic filter of a ceramic pervaporation membrane of the present invention and a view of the end face.
Figure 6B:
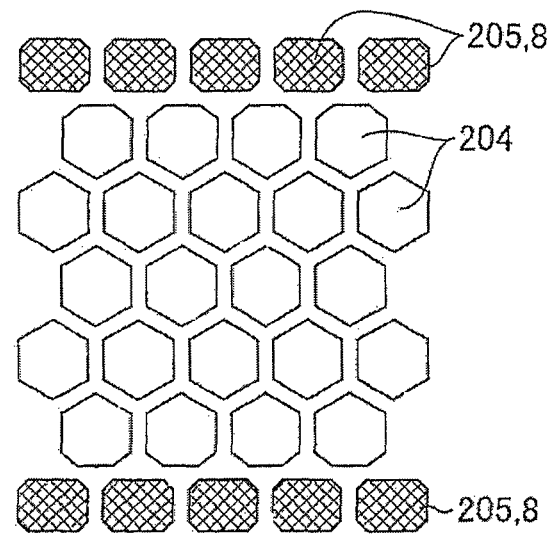
FIG. 6B is a still enlarged view showing a gap between two rows of water collection cells of FIG. 6A.

As described above, in a ceramic pervaporation membrane 1, though the number of the rows of filtration cells 4 between two rows of water collection cells 5 is 2, the number of the row of filtration cells 304 between the two rows of water collection cells 305 is 3 in the embodiment shown in FIG. 5. Thus, the rows (number of rows) of water collection cells and filtration cells can easily be understood when an end face (or a cross section) of a ceramic pervaporation membrane is viewed. In addition, in each of the embodiments shown in FIGS. 6A and 6B, the number of the rows of filtration cells 204 between the two rows of water collection cells 205 is 5 in any portion. In this case, many filtration cells 204 which are not adjacent to any of the water collection cells 205 are present, and this embodiment is not contained in the second ceramic pervaporation membrane.

Figure 4:
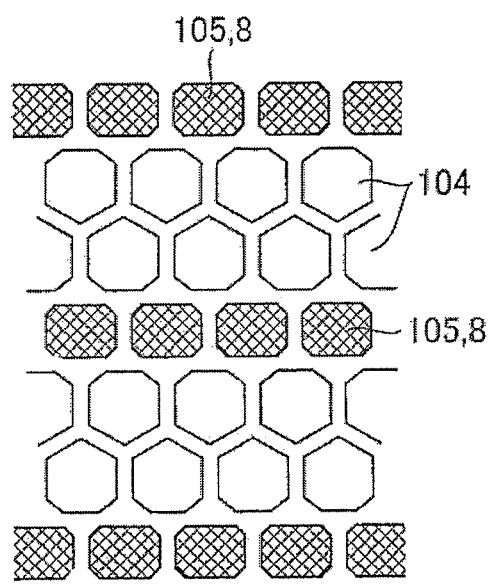
FIG. 4 is a view showing still another embodiment of a ceramic pervaporation membrane of the present invention and a view of the enlarged end face.

As described above, in the ceramic pervaporation membrane 1, the filtration cells 4 and the water collection cells 5 have a circular cross-sectional shape. In the embodiment shown in FIG. 4, the cross-sectional shape of the filtration cells 104 is heptagonal, and the cross-sectional shape of the water collection cells 105 is octagonal (or a quadrangular with the angles being rounded). In embodiments shown in FIG. 5, the cross-sectional shape of the filtration cells 304 is circular, and the cross-sectional shape of the water collection cells 305 is octagonal (or a quadrangular with the angles being rounded). In an embodiment shown in FIG. 6B, the cross-sectional shape of filtration cells 204 is hexagonal or heptagonal, and the cross-sectional, shape of the water collection cells 205 is octagonal (or a quadrangular with the angles being rounded).

Next, a method for using a ceramic pervaporation membrane of the present invention will be described by the use of the ceramic pervaporation membrane 1 shown in FIGS. 1A to 1C with the case of separating water (water vapor) from an ethanol aqueous solution as an example.

In this case, an ethanol aqueous solution (mixed fluid) is allowed to flow into it from the aperture on one end face 2 of each of the filtration cells 4 with reducing the pressure in the external space. Ethanol, which is not a permeation separation component (non-permeable fluid), of the ethanol aqueous solution having flowed therein passes through the filtration cells 4 as it is and is discharged from the aperture portion of the other end face 3. On the other side, water (water vapor), which is a permeation separation component (permeable fluid), is filtrated (permeated) through the internal portion of the porous body 9 from the separation membrane 31 disposed on the internal wall face of each filtration cell 4 and then is discharged from the outer peripheral face 6 or flows into the water collection cells 5 and discharged via the discharge channels 7 (In FIG. 1A, the arrows show the flow of water vapor as the permeation separation component).

A ceramic pervaporation membrane of the present invention preferably satisfies the relation of the following formula (7) in the case of performing separation in such a manner.

$$\Delta P/(P_1-P_2) \leq 0.5 \quad (7)$$

(wherein $\Delta P$ shows the total pressure loss in the water collection cells and the discharge channels, where no separation membrane is disposed; $P_1$ shows pressure of the mixed fluid (e.g., ethanol aqueous solution); and $P_2$ shows pressure of the external space.)

When the relation of the formula (7) is satisfied, a ceramic pervaporation membrane of the present invention can inhibit the reduction of permeation flow amount per unit time even if the permeation separation composition is gas. In order to further inhibit the reduction of permeation flow amount per unit time, $\Delta P/(P_1-P_2)$ is more preferably 0.3 or less, particularly preferably 0.2 or less.

The pressure loss in the filtration cells having no separation membrane disposed therein and the pressure loss in the discharge channels can be obtained by calculation. Further, $P_1-P_2$ (i.e., differential pressure between driving membranes) can be adjusted by the degree of pressure reduction in the external space. In addition, the influence of the pressure loss is generally increased when the permeation flow rate per unit time of a mixed fluid is 1.0 kg/m² h or more. Therefore, a ceramic pervaporation membrane of the present invention exhibits a particularly excellent effect when it is used for a mixed fluid at the permeation flow rate of 0.5 kg/m² h or more.

Next, a method for manufacturing a ceramic pervaporation membrane of the present invention will be described. In the first place, a raw material for the porous body is subjected to extrusion using, e.g., avacuum extruder to obtain a monolith type unfired support having filtration cells and water collection cells. An example of the raw material of the porous body is kneaded clay prepared by adding an organic binder such as methyl cellulose, a dispersant, and water to framework particles and an inorganic bonding material. As the framework particles, there can suitably be used at least one ceramic material selected from the group consisting of alumina, mullite, powder of potsherd, and cordierite. As the inorganic bonding material, there can suitably be used at least one material selected from the group consisting of alumina, silica, zirconia, glass frit, feldspar, and cordierite.

Then, discharge channels each passing through from one portion of the outer peripheral face to the water collection cells and communicating with another portion is formed in the unfired support obtained above to obtain a discharge channel-provided unfired support. The discharge channel can be formed by, for example, performing groove-machining on the outer peripheral face where the discharge channel is to be formed upon forming the unfired support, breaking the portion by a grinding stone or the like, and then, breaking through the water collection cell with a sharp jig. The discharge channel of about 25 mm is preferably secured as the portion for disposing a seal portion for separating the permeation separation component from the mixed liquid at an end portion upon disposing the ceramic pervaporation membrane as an end product in a clean water system or the like.

Next, a slurried plugging member is filled into the space from both the end faces of each of the water collection cells having a discharge channel formed therein to the end of the discharge channel in the discharge channel-provided unfired support obtained above to obtain a plugging member-filled unfired support. Specifically, a film (masking) of polyester or the like is attached to both the end faces of the discharge channel-provided unfired support, and holes are made in portions corresponding to specific filtration cells. Then, the end face having the film attached thereto of the discharge channel-provided unfired support is pressed into a container containing the plugging member (slurry), and the slurry is filled by further applying pressure of about 200 kg by an air cylinder or the like to obtain a plugging member-filled unfired support. Then, the plugging member-filled unfired support obtained above was fired at, for example, 900 to 1400° C. to obtain a plugging member-filled support.

On an inner wall faces of the filtration cells of the plugging member-filled support, plural intermediate layers serving as a ground of the separation membrane are preferably formed. For forming intermediate layers (forming membranes), in the first place, slurry for the intermediate layers is prepared. The slurry for the intermediate layers can be prepared by adding 400 parts by mass of water to 100 parts by mass of a ceramic raw material having the same quality as that of the unfired support and a desired particle diameter (e.g., average particle diameter of 3.2 µm), such as alumina, mullite, titania, or cordierite. In addition, an inorganic binder for a membrane may be added to the slurry for the intermediate layers in order to increase membrane strength after sintering. As the inorganic binder for a membrane, clay, kaolin, titania sol, silica sol, or glass frit can be used. The addition amount of the inorganic binder for a membrane is preferably 5 to 20 parts by mass from the viewpoint of membrane strength. The slurry for the intermediate layers is allowed to adhere to the inner wall faces of the filtration cells (using, for example, the apparatus disclosed in JP-A-61-238315), dried, and then sintered at, for example, 900 to 1050° C. to obtain the intermediate layers. The intermediate layers can be formed by the use of plural kinds of slurry where the average particle diameter is varied to form plural layers separately. This enables to have, for example, the first to third intermediate layers as the ceramic pervaporation membrane 1. Disposing a separation membrane on the intermediate layer enables to reduce the influence of unevenness of the surface of the porous body by the intermediate layer. As the results, even if the separation membrane is made thin, a defect as a ceramic pervaporation membrane can be reduced. That is, there can be obtained a ceramic pervaporation membrane where a separation membrane having high flux, low cost, and high separation performance is disposed.

Figure 7:
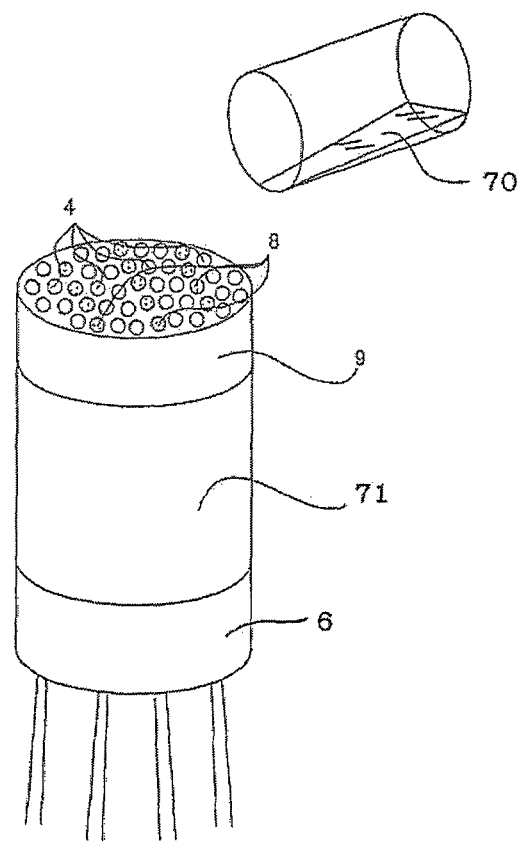
FIG. 7 is a schematic view showing an example of a state where the precursor solution is poured in the separation membrane disposition step in the manufacturing process for a ceramic pervaporation membrane of the present invention.

In the case of disposing, for example, a silica membrane (separation membrane) on the intermediate layer, prior to that, titanium isopropoxide is subjected to hydrolysis in the presence of nitric acid to obtain a titania sol, which is then diluted by water to prepare slurry for intermediate layers. After the slurry for intermediate layers prepared above is allowed to flow into predetermined cells on the cell inner wall faces of the sealed plugged member-filled support having an average pore size of 0.1 to 0.5 µm, it is subjected to a thermal treatment at 500° C. to desirably form the intermediate layers. The precursor solution (silica sol) to form the silica membrane can be prepared by subjecting tetraethoxysilane to hydrolysis in the presence of nitric acid to obtain a sol, which is then diluted by ethanol. In place of dilution by ethanol, dilution by water is possible. For example, the precursor solution 70 is allowed to adhere to the inner wall faces of the filtration cells by, as shown in FIG. 7, sealing the outer peripheral face 6 of the porous body 9 having the intermediate layers formed therein with a masking tape 71, fixing the porous body 9 to the lower end of a wide-mouth funnel which is not illustrated, and poring the precursor solution 70 (silica sol solution) to form a silica membrane from above the porous body 9, and passing the precursor solution 70 through the filtration cells 4, or by general dipping. Then, temperature is raised at the rate of 100° C./hr., maintained at 500° C. for one hour, and sent down at the rate of 100° C./hr. Such operations of pouring, drying, raising temperature, and sending temperature down are repeated three to five times to dispose a silica membrane. Thus, a ceramic pervaporation membrane having a silica membrane as the separation membrane can be obtained.

In order to dispose, for example, a carbon membrane (separation membrane) instead of a silica membrane on the intermediate layer, the precursor solution to form a carbon membrane is brought into contact with a surface of the plugging member-filled support by a means of impregnation, spin coating, spray coating, or the like to form the membrane. By mixing and dissolving a thermosetting resin such as phenol resin, melamine resin, urea resin, furan resin, polyimide resin, or epoxy resin; a thermoplastic resin such as polyethylene; a cellulose based resin; or a precursor substance of these resins in an organic solvent such as methanol, acetone, tetrahydrofuran, NMP, toluene and the like or water. When a membrane is formed by the precursor solution, an appropriate thermal treatment may be performed according to the kind of the resin contained in the solution.

EXAMPLE

Hereinbelow, the present invention will be described specifically on the basis of Examples. However, the present invention is by no means limited to these Examples.

Example 1

There was used an alumina monolith type ceramic pervaporation membrane (with alumina framework), where the external shape was circular columnar, the outer diameter was 180 mm, the length was 1000 mm (the length of each of the filtration cells and the water collection cells was 1000 mm), the diameter of the filtration cells having a circular cross-sectional shape was 2.5 mm, the quadrangular shape of the water collection cells having a quadrangular cross-sectional shape (with the rounded four corners) was 2.5 mm (longer side)×2 mm (shorter side), the wall thickness between the filtration cell and the water collection cell was 0.95 mm, and the wall thickness between the filtration cells was 0.95 mm. The each aperture length of the discharge channel parallel to the channel direction of the water collection cells was 50 mm, the number of discharge channel was 2, and the longest interval between discharge channels adjacent to each other in the channel direction of the water collection cells was 840 mm. Since the total aperture length of the discharge channels was 100 mm (=2×50 mm), it was 10% of the length of the filtration cell having a length of 1000 mm. Since the longest interval between the discharge channels was 840 mm, it was 84% of the length of the filtration cell having a length of 1000 mm. The distance between the aperture of the discharge channel and the end face was 30 mm on one side, 60 mm in total (on both sides) (100 mm+840 mm+60 mm=1000 mm). In this ceramic pervaporation membrane, there were two intermediate layers, the average pore diameter of the intermediate layer on the support side was 0.5 µm, the average pore diameter of the intermediate layer on the separation membrane side was 0.1 µm. The separation membrane disposed on the intermediate layer was an imide based carbon membrane. The filtration cells and the water collection cells formed rows, the number of the rows of filtration cells between two rows of water collection cells was 5, and the number was fixed. The ratio m/n of the number m of the rows of filtration cells to the number n of the rows of water collection cells was 5.6 as a whole.

Figure 8:
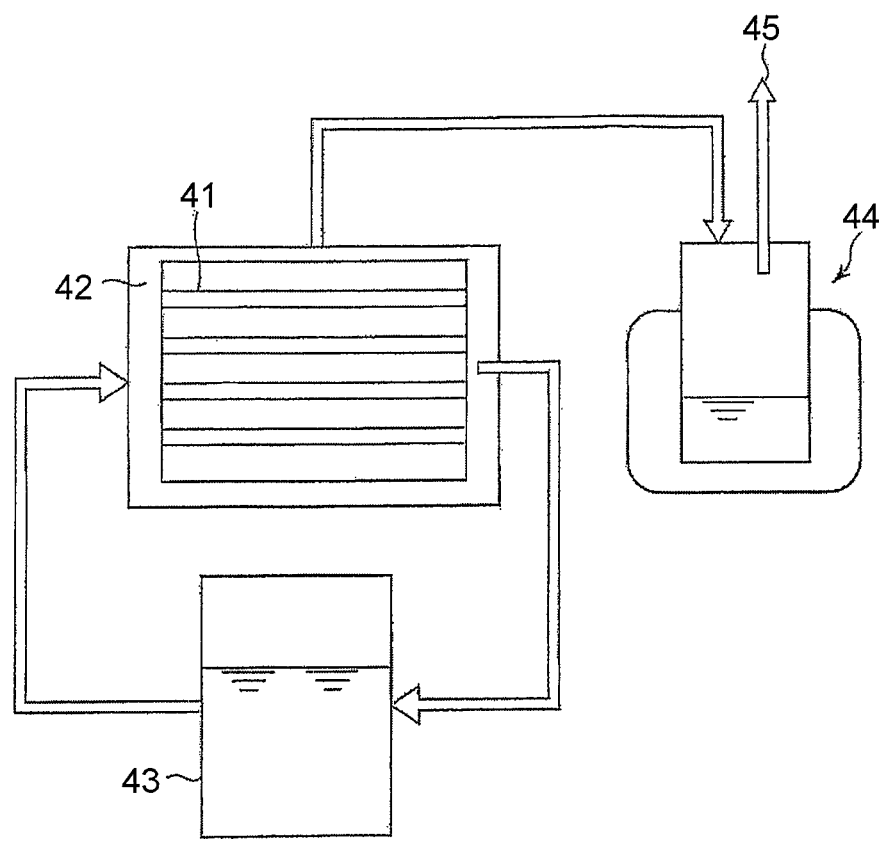
FIG. 8 is a view showing the constitution of the separation apparatus used for the pervaporation test (Examples).

[Pervaporation test] The aforementioned ceramic pervaporation membrane (ceramic pervaporation membrane 41) was incorporated into the separation apparatus shown in FIG. 8, and the test was performed by using this apparatus. The ceramic pervaporation membrane 41 was packed into a can 42, an ethanol aqueous solution 43 having a concentration of 50 mass % and a temperature of 50° C. was allowed to flow into the ceramic pervaporation membrane 41 from the inlet side (the side of the filtration cell where the separation membrane was disposed), and the operations were repeated. During that time, on the outlet side (water collection cell side) of the ceramic pervaporation membrane 41, pressure was reduced to 10 Torr by the use of a vacuum pump 45 which is not illustrated. The permeated vapor passed through the cooling trapping apparatus 44 and cooled for collection, and the mass and concentration were measured with measuring the time spent for the separation treatment. Then, the water permeation amount per one permeation membrane and water permeation rate per membrane area were obtained. The results are shown in Table 2 together with the rate m/n of the number m of the rows of filtration cells and the number n of the rows of water collection cells, the number of the rows of filtration cells between two rows of water collection cells, length of the filtration cells, cross-sectional shape of the filtration cells, kind of the separation membrane, the number of the discharge channels, cross-sectional configuration of the discharge channels (pertinent figure), the ratio of the total aperture length of the discharge channels (parallel to the channel direction of the water collection cells to the length of the filtration cells), and the ratio of the longest interval between discharge channels (adjacent to each other in the channel direction of the water collection cells to the length of the filtration cells).

[Water permeation amount per one membrane] It is a value obtained by dividing the mass of permeated vapor by time required.

[Water permeation rate per membrane area] It is a value obtained by dividing the water permeation amount per membrane by the area of the separation membrane obtained by calculation from the aforementioned shape and size of the ceramic pervaporation membrane.

TABLE 2

| | Ratio m/n of number m of rows of filtration cells to number n of rows of water collection cells | Number of rows of filtration cells between two rows of water collection cells | Length of filtration cell mm | Cross-sectional shape of filtration cell | Kind of separation membrane | Number of discharge channels |
|---|---|---|---|---|---|---|
| Example 1 | 5.6 | 5 | 1000 | circle | imide based carbon membrane | 2 |
| Example 2 | 5.6 | 5 | 1000 | circle | imide based carbon membrane | 2 |
| Example 3 | 5.6 | 5 | 1000 | circle | imide based carbon membrane | 2 |
| Example 4 | 5.6 | 5 | 1000 | circle | imide based carbon membrane | 3 |
| Example 5 | 5.6 | 5 | 1000 | circle | imide based carbon membrane | 4 |
| Example 6 | 5.6 | 5 | 1000 | circle | imide based carbon membrane | 2 |
| Example 7 | 5.6 | 5 | 1000 | circle | imide based carbon membrane | 2 |
| Example 8 | 5.6 | 5 | 1000 | circle | imide based carbon membrane | 2 |
| Comp. Ex. 1 | 5.6 | 5 | 1000 | circle | imide based carbon membrane | 2 |
| Example 9 | 2.1 | 2 | 1000 | circle | imide based carbon membrane | 2 |
| Example 10 | 2.1 | 2 | 1000 | circle | imide based carbon membrane | 2 |
| Example 11 | 2.1 | 2 | 1000 | circle | imide based carbon membrane | 2 |
| Example 12 | 2.1 | 2 | 1000 | circle | imide based carbon membrane | 3 |
| Example 13 | 2.1 | 2 | 1000 | circle | imide based carbon membrane | 4 |
| Example 14 | 2.1 | 2 | 1000 | circle | imide based carbon membrane | 2 |
| Example 15 | 2.1 | 2 | 1000 | circle | imide based carbon membrane | 2 |
| Example 16 | 2.1 | 2 | 1000 | circle | imide based carbon membrane | 2 |
| Comp. Ex. 2 | 2.1 | 2 | 1000 | circle | imide based carbon membrane | 2 |
| Example 17 | 3.2 | 3 | 1000 | circle | imide based carbon membrane | 2 |
| Example 18 | 3.2 | 3 | 1000 | circle | imide based carbon membrane | 2 |
| Example 19 | 3.2 | 3 | 1000 | circle | imide based carbon membrane | 2 |
| Example 20 | 3.2 | 3 | 1000 | circle | imide based carbon membrane | 3 |
| Example 21 | 3.2 | 3 | 1000 | circle | imide based carbon membrane | 4 |
| Example 22 | 3.2 | 3 | 1000 | circle | imide based carbon membrane | 2 |
| Example 23 | 3.2 | 3 | 1000 | circle | imide based carbon membrane | 2 |

TABLE 2-continued

| | | | | | | |
|---|---|---|---|---|---|---|
| Example 24 | 3.2 | 3 | 1000 | circle | imide based carbon membrane | 2 |
| Comp. Ex. 3 | 3.2 | 3 | 1000 | circle | imide based | 2 |

| | Configuration of cross section of discharge channel | Ratio of total aperture length of discharge channel % | Ratio of longest interval between discharge channels % | Water permeation amount per one membrane kg/h | Water permeation rate per membrane area kg/m²h |
|---|---|---|---|---|---|
| Example 1 | FIG. 1B | 10 | 84 | 11 | 0.8 |
| Example 2 | FIG. 1B | 16 | 78 | 15 | 1.0 |
| Example 3 | FIG. 1B | 20 | 74 | 16 | 1.1 |
| Example 4 | FIG. 2 | 15 | 40 | 18 | 1.2 |
| Example 5 | FIG. 3 | 20 | 27 | 20 | 1.3 |
| Example 6 | FIG. 1B | 25 | 69 | 17 | 1.1 |
| Example 7 | FIG. 1B | 30 | 64 | 17 | 1.2 |
| Example 8 | FIG. 1B | 40 | 54 | 18 | 1.2 |
| Comp. Ex. 1 | FIG. 1B | 9 | 85 | 9 | 0.6 |
| Example 9 | FIG. 1B | 10 | 84 | 22 | 1.9 |
| Example 10 | FIG. 1B | 16 | 78 | 25 | 2.1 |
| Example 11 | FIG. 1B | 20 | 74 | 26 | 2.2 |
| Example 12 | FIG. 2 | 15 | 40 | 26 | 2.3 |
| Example 13 | FIG. 3 | 20 | 27 | 28 | 2.4 |
| Example 14 | FIG. 1B | 25 | 69 | 27 | 2.2 |
| Example 15 | FIG. 1B | 30 | 64 | 27 | 2.3 |
| Example 16 | FIG. 1B | 40 | 54 | 28 | 2.3 |
| Comp. Ex. 2 | FIG. 1B | 9 | 85 | 21 | 1.8 |
| Example 17 | FIG. 1B | 10 | 84 | 17 | 1.3 |
| Example 18 | FIG. 1B | 16 | 78 | 21 | 1.5 |
| Example 19 | FIG. 1B | 20 | 74 | 22 | 1.6 |
| Example 20 | FIG. 2 | 15 | 40 | 24 | 1.8 |
| Example 21 | FIG. 3 | 20 | 27 | 25 | 1.9 |
| Example 22 | FIG. 1B | 25 | 69 | 22 | 1.7 |
| Example 23 | FIG. 1B | 30 | 64 | 23 | 1.7 |
| Example 24 | FIG. 1B | 40 | 54 | 24 | 1.8 |
| Comp. Ex. 3 | FIG. 1B | 9 | 85 | 15 | 1.1 |

Examples 2 to 8, Comparative Example 1

There were used ceramic pervaporation membranes where at least one of the number of the discharge channel, configuration of a cross section of a discharge channel, aperture length of a discharge channel (parallel to the channel direction of water collection cells), and the ratio of the longest interval between discharge channels (adjacent to each other in the channel direction of a water collection cell to the length of a filtration cell) was changed. The others were the same as Example 1, and the pervaporation test was performed to obtain the water permeation amount per membrane and the water permeation rate per membrane area. The results are shown in Table 2 together with the ratio m/n of the number m of the rows of filtration cells and the number n of the rows of water collection cells, the number of the rows of filtration cells between two rows of water collection cells, the length of the filtration cells, cross-sectional shape of the filtration cells, kind of the separation membrane, the number of the discharge channels, cross-sectional configuration of the discharge channels (pertinent figure), the ratio of the total aperture length of the discharge channels (parallel to the channel direction of the water collection cells to the length of the filtration cells), and the ratio of the longest interval between discharge channels (adjacent to each other in the channel direction of the water collection cells to the length of the filtration cells).

Examples 9 to 16, Comparative Example 2

There were used ceramic pervaporation membranes where the number of the rows of filtration cells between two rows of water collection cells was 2 (fixed) and where the ratio m/n of the number m of the rows of filtration cells to the number n of the rows of water collection cells as a whole was 2.1. The pervaporation test was performed in the same manner as in Examples 1 to 8 and Comparative Example 1 to obtain the water permeation amount per membrane and the water permeation rate per membrane area. The results are shown in Table 2 together with the ratio m/n of the number m of the rows of filtration cells and the number n of the rows of water collection cells, the number of the rows of filtration cells between two rows of water collection cells, the length of the filtration cells, cross-sectional shape of the filtration cells, kind of the separation membrane, the number of the discharge channels, cross-sectional configuration of the discharge channels (pertinent figure), the ratio of the total aperture length of the discharge channels (parallel to the channel direction of the water collection cells to the length of the filtration cells), and the ratio of the longest interval between discharge channels (adjacent to each other in the channel direction of the water collection cells to the length of the filtration cells).

Examples 17 to 24, Comparative Example 3

There were used ceramic pervaporation membranes where the number of the rows of filtration cells between two rows of water collection cells was 3 (fixed) and where the ratio m/n of the number m of the rows of filtration cells to the number n of the rows of water collection cells as a whole was 3.2. The pervaporation test was performed in the same manner as in Examples 1 to 8 and Comparative Example 1 to obtain the water permeation amount per membrane and the water permeation rate per membrane area. The results are shown in Table 2 together with the ratio m/n of the number m of the rows of filtration cells and the number n of the rows of water collection cells, the number of the rows of filtration cells between two rows of water collection cells, the length of the filtration cells, cross-sectional shape of the filtration cells, kind of the separation membrane, the number of the discharge channels, cross-sectional configuration of the discharge channels (pertinent figure), the ratio of the total aperture length of the discharge channels (parallel to the channel direction of the water collection cells to the length of the filtration cells), and the ratio of the longest interval between discharge channels (adjacent to each other in the channel direction of the water collection cells to the length of the filtration cells).

[Discussion] From the results shown in Table 2, it can be understood that the water permeation rate per membrane area becomes high when the total aperture length of discharge channel parallels to the channels direction of a water collection cell is at least 10% of the length of a filtration cell. In addition, it can be understood that, the water permeation rate per membrane area is high when the rate of the longest interval between discharge channels adjacent to each other in the discharge direction of a water collection cell is at most 78% of the length of a filtration cell, the water permeation rate per membrane area is higher when the rate of the longest interval between discharge channels adjacent to each other in the discharge direction of a water collection cell is at most 43% of the length of a filtration cell (see Examples 2 and 4), and that the water permeation rate per membrane area was particularly high when the rate is at most 27% (see Examples 3 and 5).

Example 25

There was used an alumina monolith type ceramic pervaporation membrane (with alumina framework) where the external shape was circular columnar, the outer diameter was 180 mm, the length was 1000 mm (each of the filtration cells and the water collection cells was 1000 mm), the diameter of the filtration cells was 2.5 mm, the quadrangular shape of the water collection cells having a quadrangular cross-sectional shape (with the rounded four corners) was 2.5 mm (longer side)×2 mm (shorter side), the wall thickness between the filtration cell and the water collection cell was 0.65 mm, and the wall thickness between the filtration cells was 0.65 mm. The each aperture length of the discharge channel parallels to the channel direction of the water collection cells was 50 mm, the number of discharge channel was 4, and the longest interval between discharge channels adjacent to each other in the direction of channel direction of the water collection cells was 430 mm. Since the total aperture length of the discharge channels was 200 mm (=4×50 mm), it was 20% of the length of the filtration cell having a length of 1000 mm. Since the longest interval between the discharge channels was 430 mm, it was 43% of the length of the filtration cell having a length of 1000 mm. In this ceramic pervaporation membrane, there were two intermediate layers, the average pore diameter of the intermediate layer on the support side was 0.5 µm, and the average pore diameter of the intermediate layer on the separation membrane side was 0.1 µm. The separation membrane disposed on the intermediate layer was an imide based carbon membrane. The filtration cells and the water collection cells formed rows, the number of the rows of filtration cells between two rows of water collection cells was 3, and the number was fixed. The ratio m/n of the number m of the rows of filtration cells to the number n of the rows of water collection cells in total was 3.2.

[Pervaporation test] The aforementioned ceramic pervaporation membrane (ceramic pervaporation membrane 41) was incorporated into the separation apparatus shown in FIG. 8, and the test was performed by using this apparatus. The ceramic pervaporation membrane 41 was packed into a can 42, an ethanol aqueous solution 43 having a concentration of 50 mass % and a temperature of 50° C. was allowed to flow into the ceramic pervaporation membrane 41 from the inlet side (the side of the filtration cell where the separation membrane was disposed), and the operations were repeated. During that time, on the outlet side (water collection cell side) of the ceramic pervaporation membrane 41, pressure was reduced to 50 Torr by the use of a vacuum pump 45 which is not illustrated. The permeated vapor passed through the cooling trapping apparatus 44 and cooled for collection, and the mass and concentration were measured with measuring the time spent for the separation treatment. Then, the water permeation amount per membrane and the water permeation rate per membrane area were obtained. The results are shown in Table 3 together with the ratio m/n of the number m of the rows of filtration cells and the number n of the rows of water collection cells, the number of the rows of filtration cells between two rows of water collection cells, the length of the filtration cells, the cross-sectional shape of the filtration cells, the kind of the separation membrane, the number of the discharge channels, cross-sectional configuration of the discharge channels (pertinent figure), the ratio of the total aperture length of the discharge channels (parallel to the channel direction of the water collection cells to the length of the filtration cells), and ratio of the longest interval between discharge channels (adjacent to each other in the channel direction of the water collection cells to the length of the filtration cells).

[Separation Coefficient] It is a value obtained by the following formula (8).

$$\text{Separation coefficient} = ((\text{water concentration in permeated gas})/(\text{ethanol concentration in permeated gas}))/((\text{water concentration in supply liquid})/(\text{ethanol concentration in supply liquid})) \quad (8)$$

TABLE 3

| | Ratio m/n of number m of rows of filtration cells to number n of rows of water collection cells | Number of rows of filtration cells between two rows of water collection cells | Length of filtration cell mm | Cross-sectional shape of filtration cell | Kind of separation membrane | Number of discharge channels |
|---|---|---|---|---|---|---|
| Comp. Ex. 4 | 5.6 | 5 | 1000 | circle | imide based carbon membrane | 4 |
| Example 25 | 3.2 | 3 | 1000 | circle | imide based carbon membrane | 4 |
| Example 26 | 2.1 | 2 | 1000 | circle | imide based carbon membrane | 4 |
| Example 27 | 2.1 | 2 | 1000 | circle | phenol based carbon membrane | 4 |
| Example 28 | 2.1 | 2 | 1000 | circle | silica membrane | 4 |
| Example 29 | 1 | 1 | 1000 | circle | imide based carbon membrane | 4 |
| Example 30 | 2.1 | 2 | 300 | circle | imide based carbon membrane | 4 |
| Example 31 | 2.1 | 2 | 500 | circle | imide based carbon membrane | 4 |
| Example 32 | 2.1 | 2 | 1500 | circle | imide based carbon membrane | 4 |
| Example 33 | 2.1 | 2 | 1800 | circle | imide based carbon membrane | 4 |
| Example 34 | 2.1 | 2 | 1000 | hexagon | imide based carbon membrane | 4 |

| | Configuration of cross section of discharge channel | Ratio of total aperture length of discharge channel % | Ratio of longest interval between discharge channels % | Water permeation amount per one membrane kg/h | Water permeation rate per membrane area kg/m$^2$h | Separation co-efficient |
|---|---|---|---|---|---|---|
| Comp. Ex. 4 | FIG. 3 | 20 | 43 | 13 | 0.9 | 4 |
| Example 25 | FIG. 3 | 20 | 43 | 20 | 1.5 | 6 |
| Example 26 | FIG. 3 | 20 | 43 | 22 | 1.8 | 13 |
| Example 27 | FIG. 3 | 20 | 43 | 23 | 1.9 | 8 |
| Example 28 | FIG. 3 | 20 | 43 | 21 | 1.8 | 11 |
| Example 29 | FIG. 3 | 20 | 43 | 20 | 2.0 | 8 |
| Example 30 | FIG. 3 | 20 | 43 | 8 | 2.1 | 15 |
| Example 31 | FIG. 3 | 20 | 43 | 12 | 2.0 | 14 |
| Example 32 | FIG. 3 | 20 | 43 | 29 | 1.6 | 12 |
| Example 33 | FIG. 3 | 20 | 43 | 30 | 1.4 | 10 |
| Example 34 | FIG. 3 | 20 | 43 | 20 | 1.5 | 3 |

Example 26 to 34, Comparative Example 4

There were used ceramic pervaporation membranes where at least one of the ratio m/n of the number m of the rows of filtration cells to the number n of the water collection cells, the number of the rows of filtration cells between two rows of water collection cells, the length of the filtration cells, the cross-sectional shape of filtration cells, and the kind of the separation membrane was changed. The others were the same as Example 25, and the pervaporation test was performed to obtain the water permeation amount per membrane, the water permeation rate per membrane area, and the separation coefficient. The results are shown in Table 3 together with the ratio m/n of the number m of the rows of filtration cells and the number n of the rows of water collection cells, the number of the rows of filtration cells between two rows of water collection cells, the length of the filtration cells, cross-sectional shape of the filtration cells, and kind of the separation membrane.

[Discussion] From the results shown in Table 3, it can be understood that the water permeation rate per membrane area became high when the ratio m/n of the number m of the rows of filtration cells to the number n of the rows of water collection cells is 1 to 4 (when the number of the row(s) of filtration cells is 1 to 3 between two rows of water collection cells).

In addition, from the results shown in Table 3, it can be understood that it is more preferable that the length of the filtration cells is limited because the water permeation amount per membrane cannot be increased in comparison with the case that the length of the filtration cells is 1500 mm even if the length of the filtration cells is made above 1500 mm.

Figure 9:
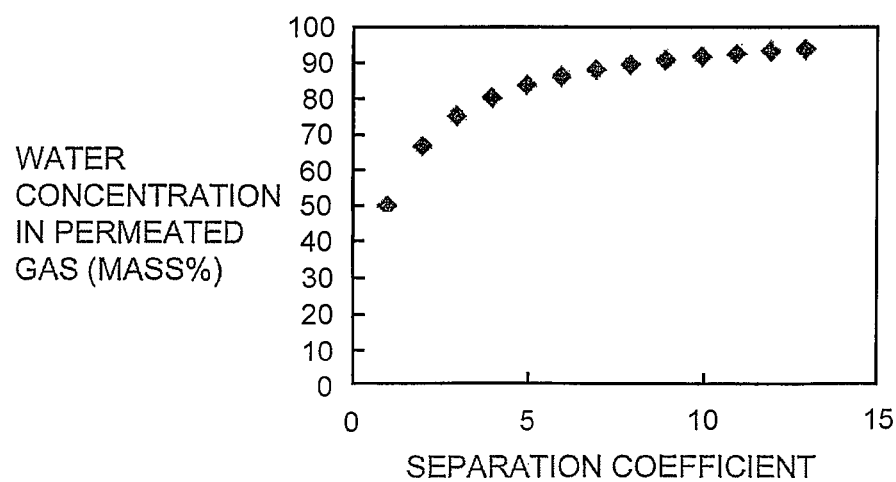
FIG. 9 is a graph showing the relation between water concentration in permeation gas having a separation coefficient of 1 to 13 and separation coefficient.

The water concentration in the permeation gas where the separation coefficient would become 1 to 13 was obtained under the conditions of Examples 25 to 34, and the relation of water concentration and separation coefficient of the permeation gas was shown in FIG. 9. From FIG. 9, it can be understood that the separation coefficient is necessarily 4 or more in order to increase the water concentration in the permeation gas (80 mass % or more) and that the water concentration in the permeation gas sharply falls when separation coefficient is below 3. Therefore, it can be understood that it is preferable that the separation coefficient is set to 4 or more (highly), and, it can be understood that, if so, it is preferable to make the cross-sectional shape of the filtration cells circular from the results shown in Table 3.

Industrial Applicability

The ceramic pervaporation membrane of the present invention is suitably used as a means for separating a part of components from a mixed fluid (mixture) by pervaporation.

DESCRIPTION OF REFERENCE NUMERALS 1, 11, 21, 41: ceramic pervaporation membrane
2: (one) end face
3: (the other) end face
4, 104, 204, 304: filtration cell
5, 105, 205, 305: water collection cell
6: outer peripheral face
7: discharge channel
8: plugging member
9: porous body
31: separation membrane
32: intermediate layer
33: intermediate layer
34: intermediate layer
35: support body
42: can
43: ethanol aqueous solution
44: cold trap apparatus
45: vacuum pump
70: precursor solution
71: masking tape
L: length of filtration cell (length of water collection cell, axial length of porous body)
d1: aperture length of discharge channel
d2 to d7: interval between discharge channels adjacent to each other in the channel direction of filtration cells

The invention claimed is:

1. A ceramic filter comprising a porous body and a separation membrane that separates a mixed fluid containing water and an organic solvent into a permeated separation water vapor,
wherein the porous body has opposed end faces and an outer peripheral face, plural filtration cells extending from one end face to the other end face and forming rows, and plural water vapor collection cells extending from one end face to the other end face and forming rows, the water vapor collection cells being plugged in both the end faces, and discharge channels provided so that the water vapor collection cells communicate with an external space, wherein a ratio m/n of the number m of the rows of filtration cells to the number n of the rows of water vapor collection cells is between 1 and 4,
the separation membrane is disposed on inner wall faces of the filtration cells of the porous body,
a total aperture length of the discharge channels parallel to the channel direction of the water vapor collection cells is at least 10% of the length of the filtration cells, and
the permeation rate per membrane area of the ceramic filter is greater than 1.8 kg/m²h.

2. The ceramic filter according to claim 1, wherein the total aperture length of the discharge channels parallel to the channel direction of the water vapor collection cells is at least 20% of the length of the filtration cells.

3. The ceramic filter according to claim 1, wherein the plural discharge channels are formed, and
the longest interval between discharge channels adjacent to each other in the channel direction of the water vapor collection cells is no more than 45% of the length of the filtration cells.

4. The ceramic filter according to claim 1, wherein the number of the rows of filtration cells between two rows of water vapor collection cells is at most 3.

5. The ceramic filter according to claim 1, wherein the number of the rows of filtration cells between two rows of water collection cells is 2 and wherein the filtration cells are constantly adjacent to the water vapor collection cells.

6. The ceramic filter according to claim 1, wherein the length of the filtration cells is 300 mm or more and 1500 mm or less.

7. The ceramic filter according to claim 1, wherein the cross-sectional shape of the filtration cells is circular.

8. A dehydration method for removing moisture as vapor from an aqueous solution, a mixed gas of water and an organic solvent or a water and an organic solvent multiphase solution by using a ceramic filter according to claim 1.

* * * * *